United States Patent

[11] 3,588,365

[72] Inventors Joseph Hood McNeilly
Harlow Essex;
Roger Alan Manship, Bishop's Stortford, England

[21] Appl. No. 826,448
[22] Filed May 21, 1969
[45] Patented June 28, 1971
[73] Assignee International Standard Electric Corporation
New York, N.Y.
[32] Priority July 11, 1968
[33] Great Britain
[31] 33043/68

[54] SUBSCRIBER SUBSET FOR PCM TELEPHONE SYSTEM
2 Claims, 3 Drawing Figs.

[52] U.S. Cl. .......... 179/15, 179/81, 179/100
[51] Int. Cl. .......... H04j 3/08
[50] Field of Search .......... 179/15(AL), 100, 100(C), 100(D), 100(L)

[56] References Cited
UNITED STATES PATENTS

| | | | |
|---|---|---|---|
| 3,458,661 | 7/1969 | Fordg et al. | 179/15(AL) |
| 3,483,329 | 12/1969 | Hunkins et al. | 179/15(AL) |
| 3,519,750 | 7/1970 | Beresin et al. | 179/15(AL) |

*Primary Examiner*—William C. Cooper
*Assistant Examiner*—David L. Stewart
*Attorneys*—C. Cornell Remsen, Jr., Walter J. Baum, Percy P. Lantzy, J. Warren Whitesel, Delbert P. Warner and James B. Raden

ABSTRACT: A subset is provided for use in a closed loop PCM telephone system. EAch subscriber set incorporates logic on a plug-in card for number detection. The plug-in cards may be transferred from one subset to another. Also one subset may have facilities for two or more cards and so enable a person visiting another subscriber to take his card with him and plug it in to that other subscriber's phone to insure that all calls for him are automatically transferred to the other subscriber's subset.

J. H. McNEILLY
R. A. MANSHIP
Inventors

By D. D. Warner
Attorney

SUBSCRIBER SUBSET FOR PCM TELEPHONE SYSTEM

This invention relates to a subscriber subset for a PCM telephone system in which a group of subscribers have access to a common "ring main" loop line arranged for the continuous unidirectional circulation of multiplexed PCM signals.

Subscribers on the loop communicate with one another by seizing a free time slot in the loop. Signals from a first subscriber are transmitted around the loop as far as a second subscriber, where they are terminated, and signals from the second subscriber are transmitted around the remainder of the loop in the same manner to the first subscriber and there terminated. The system makes use of subscriber equipments which incorporate individual pulse modulating and demodulating means, i.e. each subset includes a PCM coder and decoder. The advent of integrated solid state circuits enables such coders/decoders to be built into conventional sized telephone sets alongside other digital apparatus such as synchronizing, dialling and other circuits which can also be constructed in integrated circuits.

When a subscriber initiates a call by lifting his handset and dialling another subscriber's number this number is converted into a digital code group and the code group is inserted into a hitherto empty channel. The called subscriber's subset, if not already engaged on a call, scans all the channels and feeds the signals therein into logic arranged to detect the occurrence of the code group relevant to that subset.

According to the invention there is provided a subscriber subset for a PCM telephone system of the type set forth including a shift register, means for reading into the shift register the code groups appearing in the line in successive channels, means for sampling the shift register at the termination of each channel, at least one multisocket outlet connector, a plug-in logic means arranged to plug-in to the outlet connector, the sampled code group being fed to the logic means via the connector, the logic being coincidence logic designed to give an output whenever a predetermined code group appears in the shift register, said output being fed via the connector ringing circuits within the subset.

In a preferred embodiment of the invention the subset is provided with two or more outlet connectors connected in parallel, thus enabling two or more plug-in logic means for different code groups to be plugged in simultaneously.

By such means it is possible to provide a subset with the following facilities:

a. A subscriber's number can be changed merely by replacing one plug-in module with a different plug-in module.

b. When a subscriber is temporarily at another telephone he can take his plug-in module with him and insert it in the other phone—thus transferring all calls automatically to the other phone.

c. Two or more subscribers having a meeting in the office of one of them can all have their calls automatically transferred to that person's telephone.

d. A subscriber who does not wish to receive calls for a period may simply withdraw his plug-in module.

e. Due to the fact that code groups will circulate in the loop until either the call is answered or the called subscriber replaces his handset, a subscriber expecting an urgent call while in transit from his office to another place some distance away can insert his plug-in module at any phone he is passing to find out if that call is being attempted before he arrives at his destination.

The above mentioned and other features of the invention and the manner of attaining them will become more apparent and the invention itself will be best understood by reference to the following description of an embodiment of the invention taken in conjunction with the accompanying drawings, in which.

Figure 1:
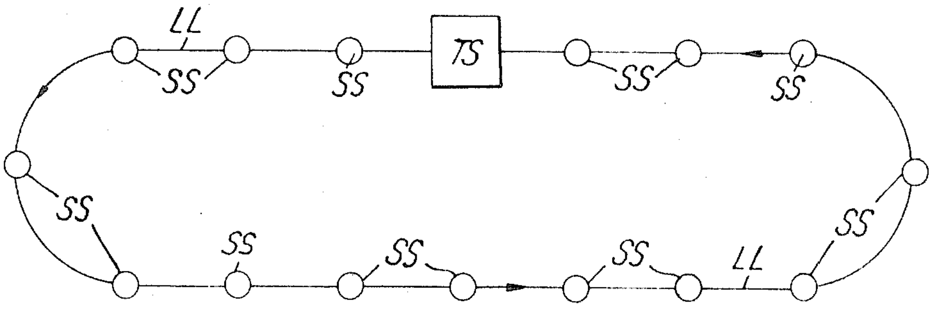
FIG. 1 is a diagrammatic illustration of the layout of a PCM telephone system of the type set forth above.

The basic network is shown in FIG. 1 and consists of a number of subscribers SS connected to one another by a closed loop unidirectional transmission line LL. The loop includes a timing station TS the function of which is to provide a number of time multiplexed channels in the loop. Each subscriber SS has access to any unused channel for the purposes of making a connection and each subscriber is responsive to his unique identification signal appearing on any channel to cause a connection to be completed. Once a channel has been seized for a particular connection it is retained by that connection until the connection is terminated and it is not available for any other subscribers.

Figure 2:
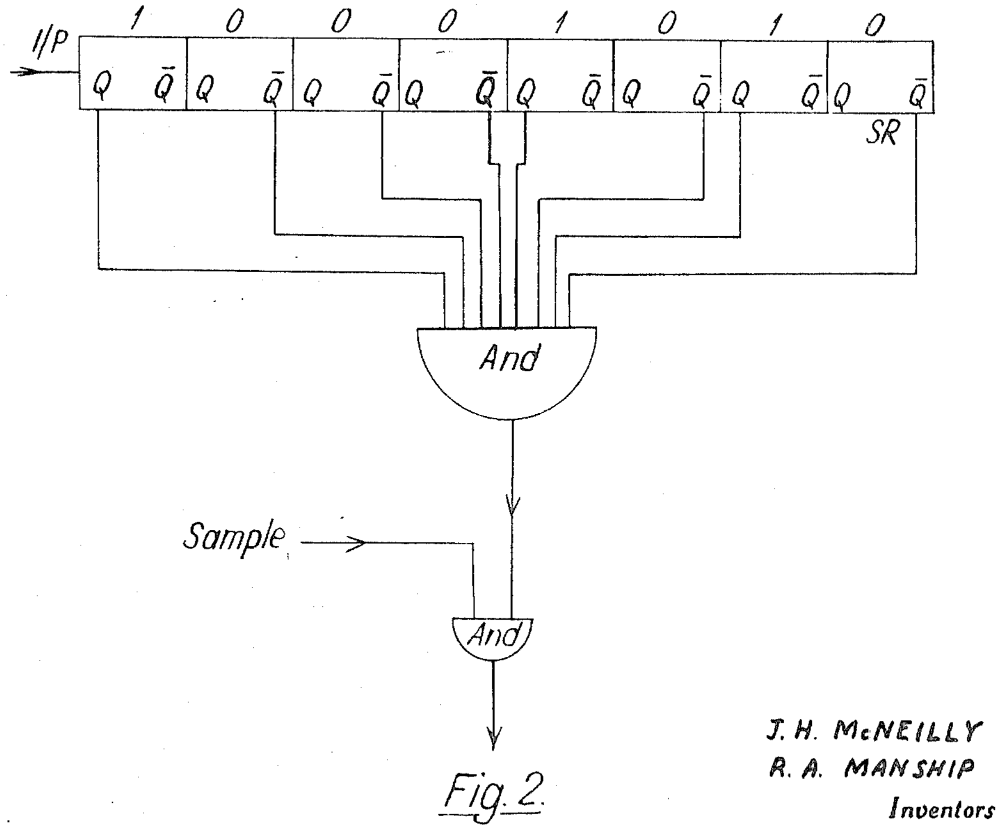
FIG. 2 illustrates the logic arrangements in a subscriber's subset for detection of a number being called.

When a subscriber is being called his number appears on the line as a unique code group. To know that he is being called the subscriber must detect the presence of this code group in a channel. This is achieved by the arrangement shown in FIG. 2. All the line information is fed into a shift register SR via the input I/P. The code is an 8-bit code and it will be assumed that the subscribers number is represented by the code group 10001010. An 8-input coincidence AND gate is connected to the eight stages of the shift register according to the code group to be detected. In this case the eight inputs are connected to the shift register outputs $Q\bar{Q}\bar{Q}\bar{Q}Q\bar{Q}Q\bar{Q}$ where Q is the true output of a shift register flip-flop and $\bar{Q}$ is the inverse output. The AND gate will give an output only when the correct code group is entered into the shift register. The AND gate is sampled at the end of each channel period, thus preventing intermediate codes giving an output O/P. For example, 0101 at the end of one channel and 0001 at the beginning of the next channel would appear to 10001010 at the midpoint of the second channel.

Figure 3:
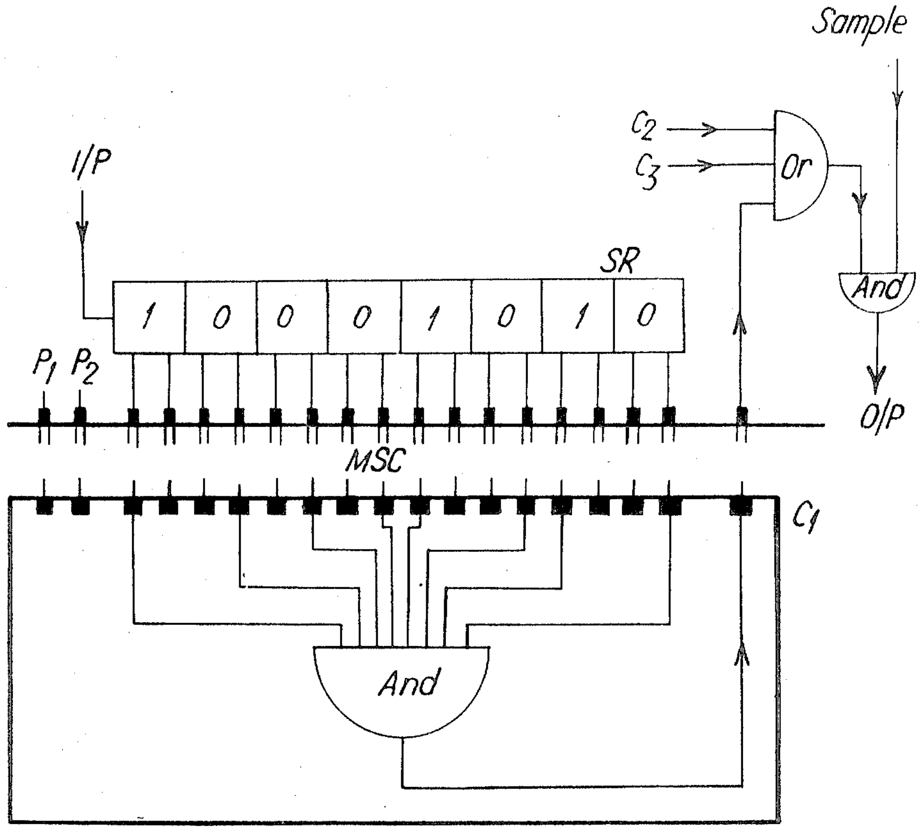
FIG. 3 illustrates the provision of a plug-in number card in a subscriber's subset.

To provide the portable number facility the modifications shown in FIG. 3 are made. All the true and inverse shift register outputs are taken to a multisocket connector MSC. A printed circuit board $C_1$ carries the necessary AND gate and is connected to the right selection of connector pins for the number required so that when plugged in it is the equivalent of the arrangement shown in FIG. 2. The output of the AND gate is returned to the main subset assembly by one extra pin and socket in the connector, and two pins $P_1$ and $P_2$ provide the necessary power supplies for the plug-in board.

As shown in FIG. 3 the output of the AND gate is led to an OR gate, which also receives the outputs of other plug-in cards $C_2$, $C_3$ etc. wired in parallel with $C_1$. The OR gate is sampled at the end of each channel period.

To change the number of the subset it is only necessary to change the plug-in card $C_1$. Similarly, a visitor can bring his card and plug it in at $C_2$, thus ensuring that all calls for him go to that phone. The limit to the number of cards which can be inserted in a subset is set only by the size of the subset and the stacked cards.

It will be appreciated that once the called subscriber lifts his handset, for whatever reason, the action of the ringing circuits must be inhibited. Under these circumstances the sampling of the second AND gate is inhibited for the purposes of number detection. The shift register will still receive all the line signals but its outputs will now be for the speech decoder only.

It is to be understood that the foregoing description of specific examples of this invention is made by way of example only and is not to be considered as a limitation on its scope.

We claim:

1. A subscriber subset for a PCM telephone system having a continuous loop line comprising a shift register, means for reading into the shift register signals forming code groups appearing in the line in successive channels, means for sampling the shift register at the termination of each channel, at least one multisocket outlet connector, means including a plug-in logic circuit arranged to plug-in to the outlet connector, means for feeding the sampled code group to the logic circuit via said connector, the logic circuit embodying coincidence logic designed to give an output whenever a predetermined code group appears in the shift register, and means connecting said output via the connector to ringing circuits within the subset.

2. A subset according to claim 1 having two or more outlet connectors connected in parallel to the shift register, the outputs of all plug-in logic means being fed to an OR gate within the subset, the output of the OR gate being fed to the ringing circuits.